United States Patent [19]

Schwenk

[11] Patent Number: 5,903,649
[45] Date of Patent: May 11, 1999

[54] METHOD FOR ESTABLISHING A COMMON CODE FOR AUTHORIZED PERSONS THROUGH A CENTRAL OFFICE

[75] Inventor: Joerg Schwenk, Dieburg, Germany

[73] Assignee: Deutsche Telekom AG, Bonn, Germany

[21] Appl. No.: 08/731,364

[22] Filed: Oct. 11, 1996

[30] Foreign Application Priority Data

Oct. 14, 1995 [DE] Germany .......................... 195 38 385

[51] Int. Cl.⁶ .............................. H04L 9/00; H04N 7/16
[52] U.S. Cl. .................................. 380/20; 380/9; 380/10; 380/23; 380/49
[58] Field of Search .................................. 380/6, 7, 9, 10, 380/21, 23, 25, 28, 44, 45, 46, 47, 49, 20

[56] References Cited

U.S. PATENT DOCUMENTS

| | | | |
|---|---|---|---|
| 5,124,117 | 6/1992 | Tatebayashi et al. . | |
| 5,199,070 | 3/1993 | Matsuzaki et al. . | |
| 5,208,859 | 5/1993 | Bartucci et al. | 380/45 |
| 5,241,597 | 8/1993 | Bright | 380/21 |
| 5,381,479 | 1/1995 | Gardeck et al. | 380/21 |
| 5,412,722 | 5/1995 | Sherly et al. | 380/21 |
| 5,471,532 | 11/1995 | Gardeck et al. | 380/21 |
| 5,528,691 | 6/1996 | Rosauer et al. | 380/21 |

OTHER PUBLICATIONS

Using A Local Password For Two–Step Authentication. In: IBM Technical Disclosure Bulletin, vol. 35, No. 4A, Sep. 1992, 373–375.

Zu–hua, S.: Public–key cryptosystem and digital–signature schemes based on linear algebra over a local ring. In: IEE Proceedings, vol. 134, Pt. E, No. 5, Sep. 1987, 254–256.

IEEE Infocom '93. The Conference on Computer Communications Proceedings. Twelfth Annual Joint Conference of the IEE Computer and Communications Societies. Networking: Foundation for the Future (CAT. No. 93CH3264–9), San Francisco, CA, USA, 28 Mar.–, ISBN 0–8186–3580–0, 1993, Los Almitos, CA, USA, IEEE Comnput. Soc. Press, USA, 1406–1413 vol. 3, XP000419708 Laih C –S et al: "On the design of conference key distribution systems for the broadcasting networks".

Advances in Cryptology—Crypto '93. 13th Annual International Cryptology Conference Proceedings, Proceedings of Crypto '93. Santa Barbara, CA, USA, Aug. 22–26, 1993, ISBN 3–540–57766–1, 1994, Berlin, Germany, Springer–Verlag, Germany, 480–491, XP000502372 Fiat A et al: "Broadcast encryption".

Communications of the ACM, Nov. 1979, USA, 1–4 Bd. 22, Nr. 11, ISSN 0001–0782, 612–613, XP000565227 Shamir A: "How to share a secret".

*Primary Examiner*—Bernarr E. Gregory
*Attorney, Agent, or Firm*—Kenyon & Kenyon

[57] ABSTRACT

To provide sufficient security, a method, based on the use of a code-controlled one-way function with a threshold scheme, is described. N shadows $s_i$ are derived from the personal code of each of n authorized persons in the central office, a code k is calculated in the central office from the n shadows $s_i, \ldots s_n$ using an (n, t) threshold scheme, and the data for establishing code k is transmitted though an unsecured channel. The data for establishing code k comprises data required for deriving shadows $s_i$ from the personal codes $k_i$ and n-1 other shadows of the (n,t) threshold scheme, which other shadows differ from the shadows of the authorized persons. The method can be used for a plurality of purposes; however, it is specifically designed for providing security in the transmission of a broadcast program subject to fees (pay-TV, pay-radio).

6 Claims, 1 Drawing Sheet

METHOD FOR ESTABLISHING A COMMON CODE FOR AUTHORIZED PERSONS THROUGH A CENTRAL OFFICE

FIELD OF THE INVENTION

The invention concerns a method for establishing a common code for authorized persons though a central office. The method can be used for a plurality of purposes; however, it is specifically designed for providing security in the transmission of a broadcast program subject to fees (pay-TV, pay-radio).

RELATED TECHNOLOGY

A method for establishing a common code is implemented, for example, in DIN EN 50 094 for the Eurocrypt pay-TV system. It is used for the establishment of common secret information k (code) for authorized persons from a larger group of persons $P=(P_1, \ldots, P_m)$ through a central authority Z (central office).

The central office decides which, of the group P of persons, are authorized. (For example to receive a pay-for-TV broadcast). The method guarantees that only these persons can obtain or calculate the code k. As used herein, authorized persons are designated generally as $P_1, \ldots, P_n$ (so that $n \leq m$ applies). Messages can be sent from the central office to a group of users of P through a broadcasting medium (earth-based broadcast, satellite, cable network) or other unsecured channels.

The use of a symmetric encryption algorithm has been disclosed (see A. Beutelspacher: Cryptology, The Mathematical Society of America, 1994 for the definition of a symmetric encryption algorithm). Each person $P_i$ from P is assigned a personal code $k_i$ known only to the person himself and the central office. The central office Z selects the code k and only encrypts it for $I=1, \ldots, n$ with the corresponding personal code $k_i$:

$C_i = E(k_i, k)$.

This cryptogram is then sent to the (authorized) person $P_i$, who can calculate code k by decoding the cryptogram:

$D(k_i, C_i) = D(k_i, E(k_i, k)) = k$.

This method is used, for example, in the Eurocrypt pay-TV system (DIN EN 50 094) for establishing a system code.

The disadvantage of this method consists of the fact that code k is transmitted encrypted. In many countries the use of an encryption algorithm is legally restricted. These restrictions mean that only a very weak algorithm E (for "encryption" may be able to be used.

SUMMARY OF THE INVENTION

The object of the invention is to provide a method usable without restrictions that is sufficiently secure at the same time.

The present invention therefore provides a method for establishing a common code k for authorized persons, with the number of authorized persons being a time-variable subset of the total number of participants. The data for determining code k are provided through a central office Z via unsecured channels, in particular a broadcast medium where each of the participants has a personal code $K_i$, known only to the participant in question and the central office. The steps of the method provide that the central office derives a partial code (shadow) $s_i$ from the personal code of each of the n authorized persons. An (n,t) threshold scheme (with $t \geq 2n-1$) is then built from the totality of shadows obtained from the personal codes of the authorized persons. The code k is then calculated from the n shadows $s_1, \ldots s_n$ with the help of this (n,t) threshold scheme. The data for establishing code k at the reception side, comprising the data required for deriving shadows $s_i$ from the personal codes $k_i$ and from n−1 other shadows of the (n,t) threshold scheme differing from the shadows of the authorized persons, are transferred through the unsecured channel. Then, on the reception side, the authorized persons derive code k by calculating shadow $s_i$ assigned to them from their personal code $k_i$, and from this shadow, using n−1 other shadows and the (n,t) threshold scheme, calculate code k.

Furthermore, the method may provide that, in the central office, the partial code (shadow) $s_i$ may be derived in the form $s_i = f(r, k_i)$ from the personal code for each of the n authorized persons by using a common parameter r and a personal code $k_i$, with the help of a one-way function $f(.,.)$.

The (n,t) threshold scheme may be implemented through an (n−1)th-degree polynomial, uniquely defined through n solution points derived with the help of the shadows, and in which further shadows are obtained by the central office by selecting points on the polynomials' line that are different from the solution points obtained from the shadows of the authorized participants.

The method may be used to successively establish a hierarchy of codes.

DETAILED DESCRIPTION

Figure 1:
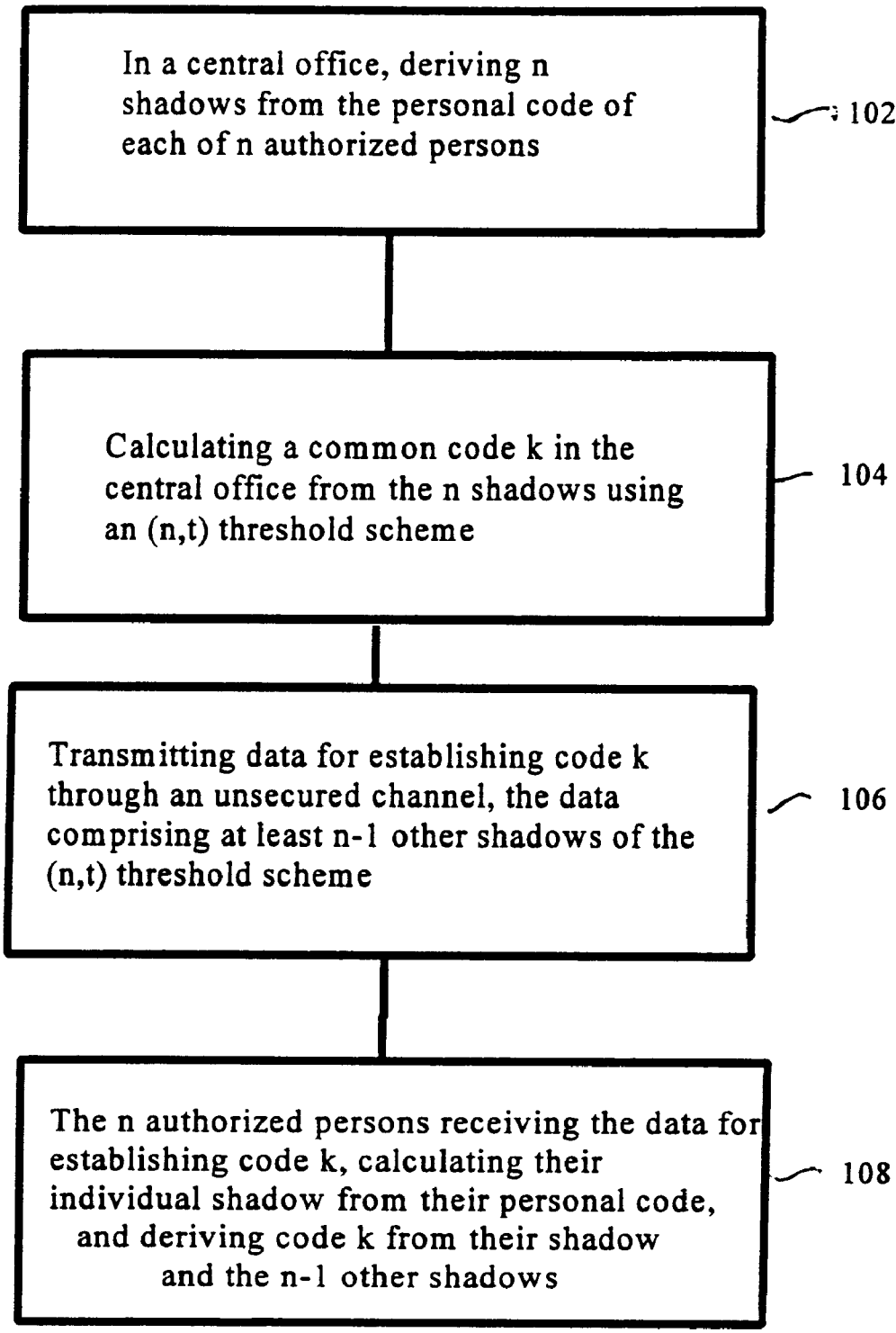
FIG. 1 shows a flow chart of the method of the present invention

The invention, which is described in more detail below through examples of embodiments and FIG. 1, comprises emulating the functionality of the above-described method with the methods of symmetric cryptography, but without using encryption methods. The security of the code distribution mechanism can thus be improved while the legal regulations are being observed.

The invention described herein is based on a combination of a code-controlled one-way function with a threshold scheme (A. Shamir: How to Share a Secret, Comm. ACM, Vol. 24, No. 11, 1979, 118–119).

A one-way function (see Beutelspacher, as above) is an easy-to-evaluate function $g(.)$ (i.e., $g(a)$ is easily calculated for each value a), for which it is, however, virtually impossible to find a preimage a for a given image b so that $g(a)=b$ applies. A code-controlled one-way function is a one-way function $(f.,.)$ with two arguments k and a, where k can be considered as a code.

Using an (n,t) threshold scheme, a code k can be decomposed into t parts, called shadows, so that this code can be reconstructed from any n of the t shadows.

As an example of such an (n,t) threshold scheme, we shall use an (n−1)th-degree polynomial, from which $t=2n-1$ solution points are selected as shadows. A unique (n−1)th-degree polynomial is defined by providing n solution points, i.e., n pairs $(x_i, y_i)$ ($I=1, \ldots, n$) of elements of a domain with different x components. This polynomial intersects the y axis at a uniquely defined point.

To establish a common code for the authorized persons $P_1, \ldots, P_n$, first a solution point $(a_j, b_j)$ is assigned to each person $P_j$ out of P, using the personal code $k_j$. (See step 102, FIG. 1) This can be done in different ways:

1. $(a_j, b_j) := (j, k_j)$,
2. $(a_j, b_j) := (j, g(k_j))$ for a one-way function $g(.)$, 3. $(a_j,b_j):=(j, f(r,k_j))$ for a code-controlled one-way function $f(.,.)$ and a random number r, 4. $(a_j,b_j):=(f(r,l_j), f(r,l_j'))$ for a code-controlled one-way function $f(.,.)$, a random number r and $k_j=(l_j,l_j')$, etc.

Solution points $(a_1,b_1), \ldots, (a_n,b_n)$ define an (n−1)th-degree polynomial p(x). The unique point of intersection $$k:=p(0)$$

of this polynomial with the y axis is the common code for $P_1, \ldots, P_n$. (See step 104, FIG. 1). The central office selects n−1 other solution points $(c_1,d_1), \ldots, (c_{n-1},d_{n-1})$, which must be different from $(a_1,b_1), \ldots, (a_n,b_n)$ to enable the authorized persons $P_1, \ldots, P_n$ to calculate this value k. These, together with the additional information required for calculating the solution points (e.g., the random number r from 3. above), can be sent to all persons of P. (See step 106)

Only the authorized persons $P_j$ ($1 \leq j \leq n$) can now calculate the code k. For this purpose, $P_j$ (the authorized recipient) utilizes amounts $(c_1,d_1), \ldots, (c_{n-1}, d_{n-1})$ along with his solution point $(a_j,b_j)$, which can only be calculated by $P_j$ and the central office, since only $P_j$ and the central office know the personal code $k_j$. The n solution points thus obtained uniquely determine polynomial p(x) and thus also the number k=p(0). (See step 108)

Unauthorized persons $P_j^i$ ($n+1 \leq j \leq m$) cannot calculate code k, since the potential points they can try to calculate $(a_j,b_j)$ are not located on the line of p(x).

An extremely simple numerical example demonstrating the above steps can be shown using n=3, in other words, with three authorized persons $P_1$, $P_2$, and $P_3$. $P_1$ has a secret code $k_1=3$, $P_2$ has a secret code $k_2=5$, and $P_3$ has a secret code $k_3=9$. Using the method (1.) above, the central office can create n shadows or solution points: (1,3), (2,5) and (3,9). The central office can then easily derive, from the three (x, p(x)) solution points, a second polynomial $p(x)=p_0+p_1x+p_2x^2=3-x+x^2$. As can be seen, p(1)=3, p(2)=5 and p(3)=9. The secret code then is k=p(0)=3. The central office then chooses (n−1) other solution points or shadows, for example, (4,15) and (5,23), and broadcasts this information. User $P_2$ for example, since he is authorized, can then use his secret code 5 to form his shadow (2,5) at the receiving end. With the two broadcast points (4,15) and (5,23) and his own shadow, he can then determine the polynomial and thus the secret code k.

A recommended implementation of the invention presented here uses a code-controlled one-way function, i.e., a version of method (3.) or (4.), for deriving the solution points in order to prevent any unauthorized access, which would be possible with the use of the weaker versions (1.) and (2.). In this case, it can be shown that an unauthorized person could only break a code k established according to this method by inverting the one-way function.

What is claimed is:

1. A method for establishing a common authorization code k for n authorized persons in a group of participants through a central office via unsecured channels, where each of the participants has a personal authorization code $k_i$, the method comprising the steps of:

deriving n solution points $s_i$ from the personal authorization code of each of the n authorized persons in the central office, constructing an (n,t) threshold coding system from the n solution points of the n authorized persons, calculating the common authorization code k in the central office from the n solution points $s_i, \ldots, s_n$ using the (n, t) threshold coding system, and transmitting data for establishing common authorization code k through an unsecured channel, the data for establishing common authorization code k comprising data required for deriving solution points $s_i$ from the personal authorization codes $k_i$ and n−1 other solution points of the (n,t) threshold system, the other solution points differing from the solution points of the authorized persons.

2. The method as recited in claim 1 further comprising the steps of at least one of the n authorized persons receiving the data for establishing common authorization code k, calculating solution points $s_i$ assigned to them from their personal authorization code $k_i$, and deriving common authorization code k from at least their solution point $s_i$ and the n−1 other solution points.

3. The method as recited in claim 1 wherein the solution point $s_i$ is derived in the form $s_i=f(r,k_j)$ from the personal authorization code for each of the n authorized persons by using a common parameter r and the personal authorization code $k_i$, with the help of a one-way function f( . . . ).

4. The method as recited in claim 1 wherein the (n,t) threshold coding system is implemented through an (n−1) th-degree polynomial. uniquely defined through the n solution points, and in which the n−1 other solution points are obtained by selecting points on the polynomial's line that are different from the n solution points.

5. The method as recited in claim 1 further comprising the step of establishing a hierarchy of common authorization codes.

6. A method for establishing a common authorization code k by n authorized persons who each have an individual authorization code $k_i$ from which an individual solution point of a polynomial can be determined, the method comprising the steps of at least one of the n authorized persons:

receiving (n−1) other solution points of the polynomial, the (n−1) other solution points being other than the solution points which may be determined by the n authorized persons;

determining their individual solution point from their individual authorization code $k_i$ by using a one-way function; and establishing the common authorization code k using their individual solution point and the (n−1) other solution points.

* * * * *